US012736193B2

(12) United States Patent
Li

(10) Patent No.: US 12,736,193 B2

(45) Date of Patent: Sep. 15, 2026

(54) RECESSED DOWNLIGHT WITH MODULAR DESIGN

(71) Applicant: BAIDE ILLUMINATION TECHNOLOGY(ZHONGSHAN) CO., LTD, Zhongshan (CN)

(72) Inventor: Xinde Li, Zhongshan (CN)

(73) Assignee: BAIDE ILLUMINATION TECHNOLOGY(ZHONGSHAN) CO., LTD, Zhongshan (CN)

( * ) Notice: Subject to any disclaimer, the term of this patent is extended or adjusted under 35 U.S.C. 154(b) by 0 days.

(21) Appl. No.: 19/267,676

(22) Filed: Jul. 14, 2025

(65) Prior Publication Data

US 2025/0341294 A1 Nov. 6, 2025

(51) Int. Cl.

| | |
|---|---|
| ***F21S 8/02*** | (2006.01) |
| ***F21V 17/16*** | (2006.01) |
| ***F21V 21/04*** | (2006.01) |
| ***F21V 29/70*** | (2015.01) |

(52) U.S. Cl.

CPC .............. *F21S 8/026* (2013.01); *F21V 17/16* (2013.01); *F21V 21/04* (2013.01); *F21V 29/70* (2015.01)

(58) Field of Classification Search

CPC ........ F21V 21/04; F21V 17/00; F21V 17/005; F21V 17/04; F21V 17/06; F21V 17/08; F21V 17/10; F21V 17/14; F21V 17/18; F21V 15/01; F21V 23/003; F21V 23/004; F21V 23/006; F21V 23/007; F21V 23/009; F21V 29/83; F21S 8/026

See application file for complete search history.

(56) References Cited

U.S. PATENT DOCUMENTS

| | | | | |
|---|---|---|---|---|
| 8,641,243 | B1 * | 2/2014 | Rashidi | F21V 23/06 362/249.02 |
| 2010/0296272 | A1 | 11/2010 | Roos et al. | |
| 2013/0010476 | A1 * | 1/2013 | Pickard | F21V 17/10 362/311.03 |
| 2014/0003039 | A1 | 1/2014 | Steadman et al. | |
| 2014/0307450 | A1 | 10/2014 | Cho | |
| 2015/0219331 | A1 * | 8/2015 | Clark | F21V 14/02 362/364 |
| 2016/0348861 | A1 * | 12/2016 | Bailey | F21V 7/28 |

FOREIGN PATENT DOCUMENTS

| | | | |
|---|---|---|---|
| CN | 220038386 U * | 11/2023 | F21V 23/0442 |

* cited by examiner

*Primary Examiner* — Erin Kryukova

(74) *Attorney, Agent, or Firm* — Hemisphere Law, PLLC

(57) ABSTRACT

A recessed downlight with a modular design is specifically provided, which relates to the technical field of downlights. A clamping ring, two positioning latches, and a light reflection cup are together put into an inner wall of a light cylinder. When the positioning latches are in contact with the inner wall of the light cylinder, the two positioning latches are pressed to deform. After the positioning latches are aligned with positioning slots, the positioning latches restore original shapes and are clamped into positioning slots to complete mounting of the clamping ring. During mounting of a lampshade, two positioning clamping blocks are aligned with two gaps, the lampshade is moved upwards to cause tops of the positioning clamping blocks to penetrate through the two gaps.

4 Claims, 7 Drawing Sheets

RECESSED DOWNLIGHT WITH MODULAR DESIGN

TECHNICAL FIELD

The present disclosure relates to the technical field of downlights, and in particular, to a recessed downlight with a modular design.

BACKGROUND

A downlight is a lighting fixture with a screw base that can be directly installed with an incandescent light bulb or an energy-saving lamp light bulb. The downlight is a lighting fixture that is embedded into a ceiling and emits light downwards.

The downlight has been widely used in home decoration. Most existing downlights are integrated. When a component of a downlight is damaged, this component cannot be replaced or repaired, and the entire downlight needs to be replaced, causing a waste of downlights. Therefore, in order to address such issues, a recessed downlight with a modular design is provided.

SUMMARY

The present disclosure aims to overcome the shortcomings in the prior art, and provides a recessed downlight with a modular design.

In order to achieve the above objective, the present disclosure provides the following technical solutions:

A recessed downlight with a modular design includes a light cylinder. An inner wall of the light cylinder is connected with a mounting plate. A drive is mounted at a top of the mounting plate. A top of the inner wall of the light cylinder is clamped with a sealing plate. A conductive cable is mounted at a top of the drive. A top of the conductive cable penetrates through the sealing plate and is connected with a conductive plug. Bottoms of two outer sides of the light cylinder are jointly connected with a fastening component. Positioning slots are provided in bottoms of the two outer sides of the light cylinder and a top of the fastening component. A bottom of the mounting plate is connected with a connecting plate through a bolt. A luminous body is mounted in a center of a top of the connecting plate in a penetrating manner. A clamping ring is arranged at a bottom of the inner wall of the light cylinder. Two outer sides of the clamping ring are connected with positioning latches used in conjunction with the positioning slots. A top of the clamping ring is connected with a light reflection cup. A lampshade sleeves the fastening component. Tops of two ends of an inner wall of the lampshade are connected with positioning clamping blocks.

Preferably, a plurality of heat dissipation slots are provided in two sides of a top of the sealing plate in a penetrating manner. U-shaped strips are arranged on two sides of a bottom of the sealing plate and are located under the heat dissipation slots.

Preferably, a lens is inlaid at an inner wall of the clamping ring. A socket used in conjunction with the luminous body is provided in one end of an inner wall of the light reflection cup.

Preferably, the fastening component includes a locking edge and a progressive edge. The locking edge and the progressive edge are respectively located on two sides of the light cylinder. Inner walls of both the locking edge and the progressive edge are connected to the light cylinder. Two gaps used in conjunction with the positioning clamping blocks are formed between sides of the locking edge and sides of the progressive edge, and the sides of the locking edge are opposite to the sides of the progressive edge.

Preferably, one end of a top of the locking edge is connected with a limiting convex block. A plurality of antislip grooves are provided in a top of the progressive edge.

Compared with the prior art, the present disclosure has the beneficial effects below:

In the present disclosure, due to the cooperation of the clamping ring, the light cylinder, the positioning latches, and the positioning slots, the clamping ring, the positioning latches, and the light reflection cup are together put into the inner wall of the light cylinder. When the positioning latches are in contact with the inner wall of the light cylinder, the two positioning latches are pressed to deform. After the positioning latches are aligned with positioning slots, the positioning latches restore original shapes and are clamped into the positioning slots to complete mounting of the clamping ring. During mounting of the lampshade, the two positioning clamping blocks are aligned with the two gaps, and the lampshade is moved upwards to cause the tops of the positioning clamping blocks to penetrate through the two gaps. Later, the lampshade is rotated to drive the two positioning clamping blocks to respectively rotate at the tops of the locking edge and the progressive edge. After one positioning clamping block rotates to be separated from the antislip groove, the mounting of the lampshade is finally completed. When a damaged luminous body needs to be replaced, the two positioning latches are pressed to be released from the positioning slots. The clamping ring is taken down, and in this case, the light reflection cup is taken down too. The bolt for positioning the connecting plate is removed. The connecting plate is removed to remove the luminous body on the connecting plate. A new luminous body is mounted. Finally, the removed components are mounted in sequence.

Figure 1:
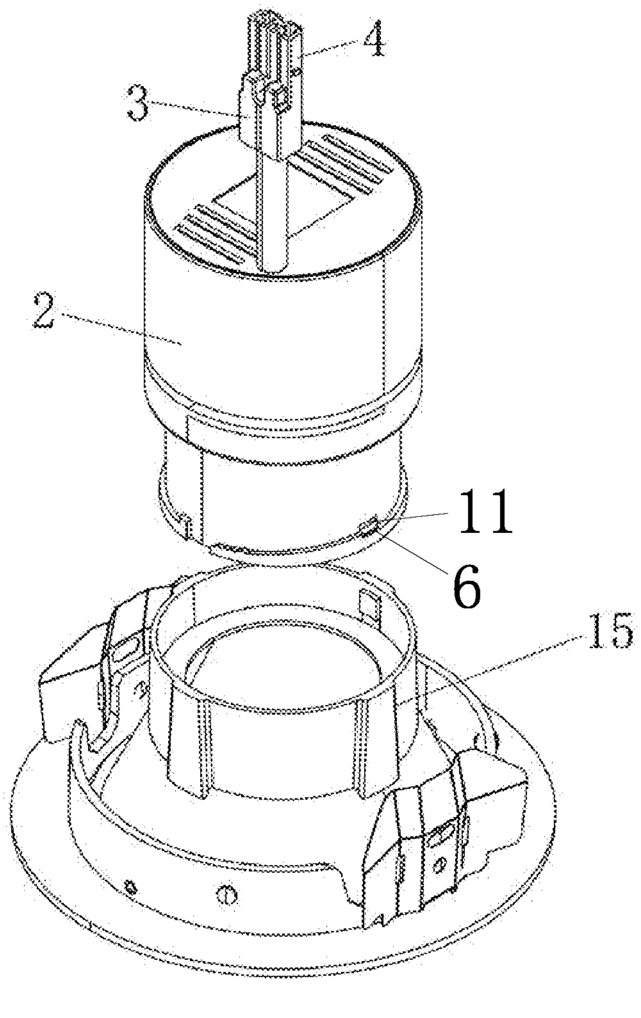
FIG. 1 is a schematic structural diagram of the present disclosure.

In the drawings: 1: clamping ring; 2: light cylinder; 3: conductive cable; 4: conductive plug; 5: fastening component; 51: locking edge; 52: limiting convex block; 53: progressive edge; 54: antislip groove; 6: positioning latch; 7: light-reflection cup; 8: luminous body; 9: drive; 10: sealing plate; 11: positioning slot; 12: connecting plate; 13: heat dissipation slot; 14: mounting plate; 15: lampshade; and 16: positioning clamping block.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely some embodiments of the present disclosure, rather than all of the embodiments.

Figure 2:
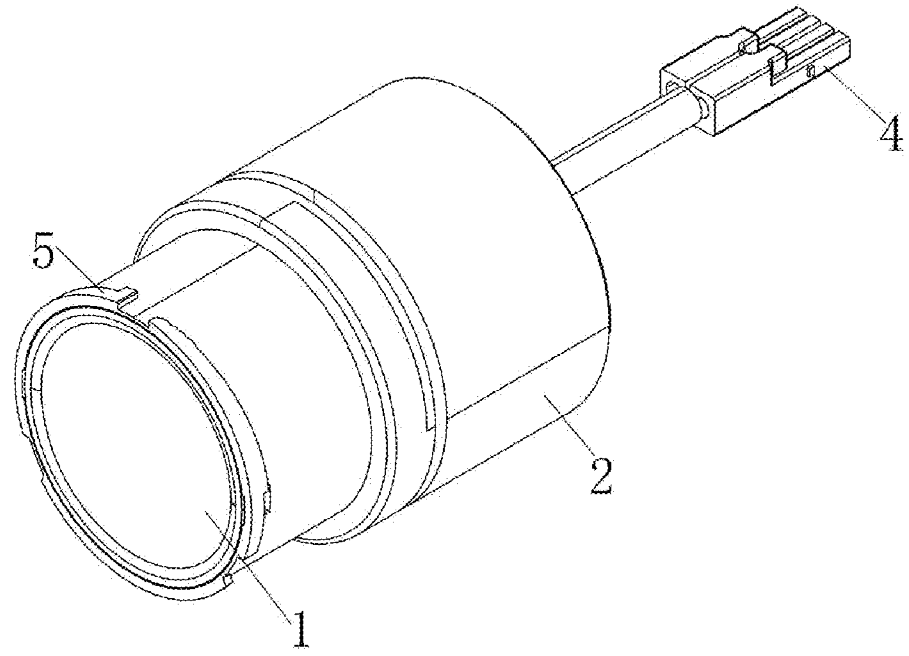
FIG. 2 is a partially schematic structural diagram of the present disclosure.
Figure 3:
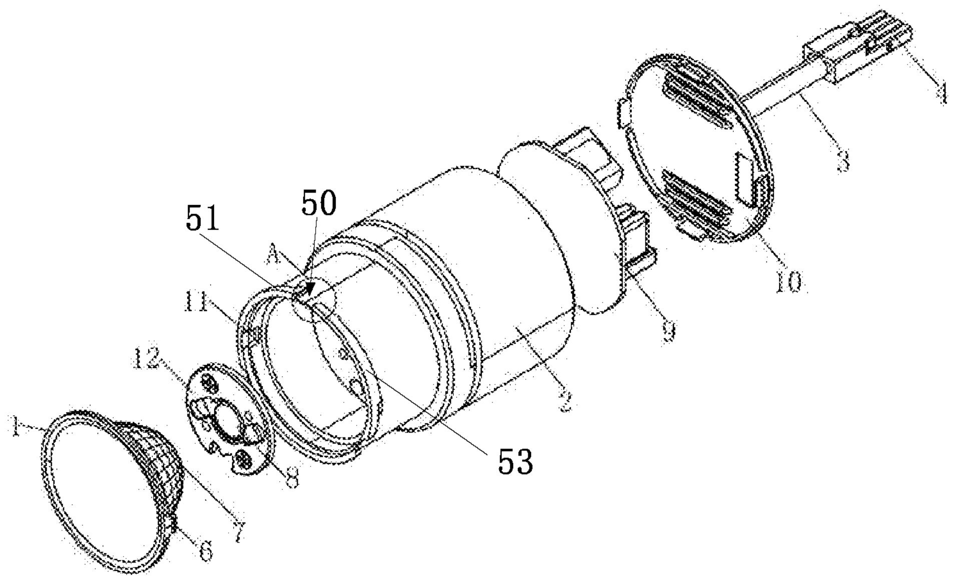
FIG. 3 is a structural exploded diagram of the present disclosure.
Figure 4:
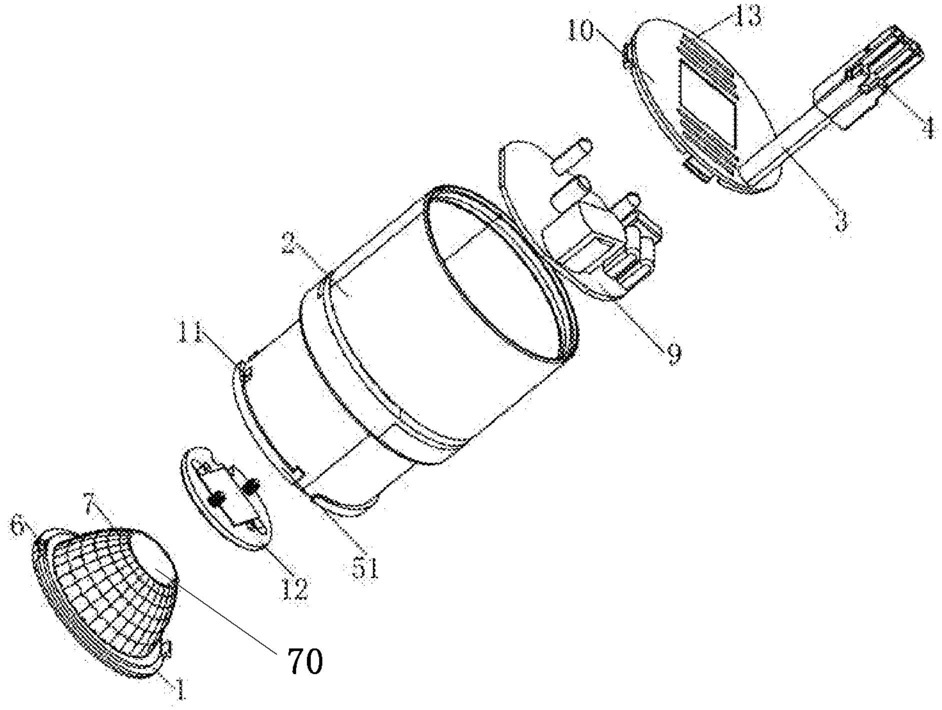
FIG. 4 is a top view of FIG. 3 according to the present disclosure.
Figure 5:
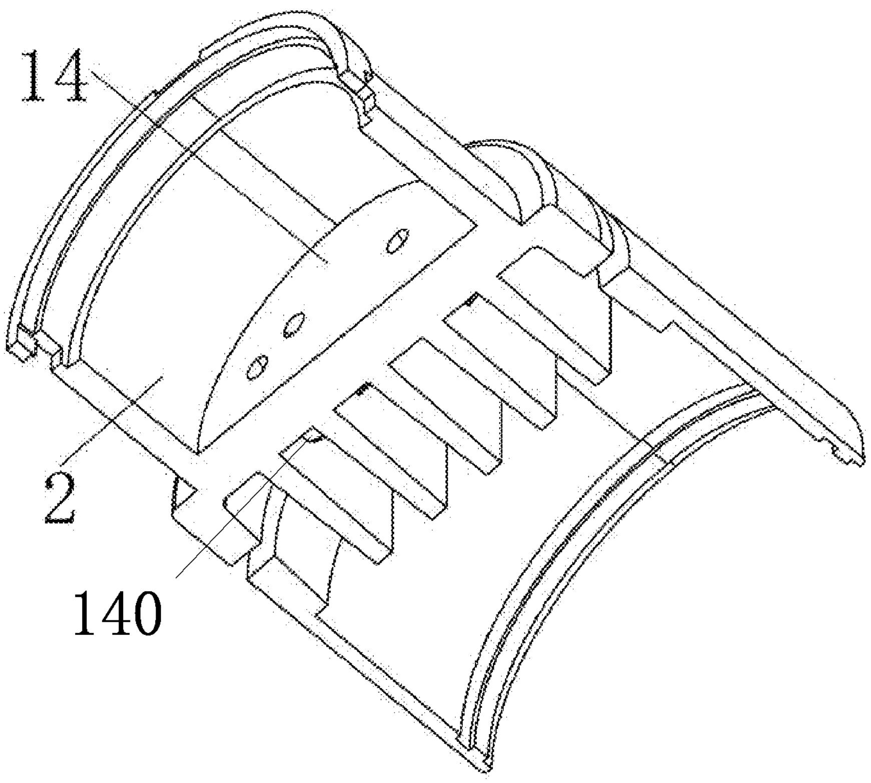
FIG. 5 is a cross-sectional view of a structure of a light cylinder according to the present disclosure.
Figure 6:
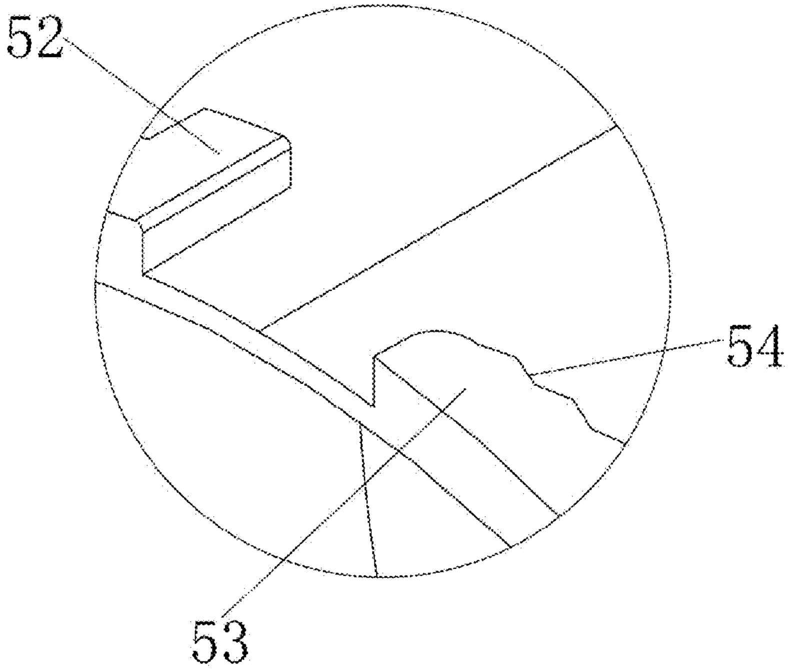
FIG. 6 is an enlarged view of A in FIG. 3 according to the present disclosure.
Figure 7:
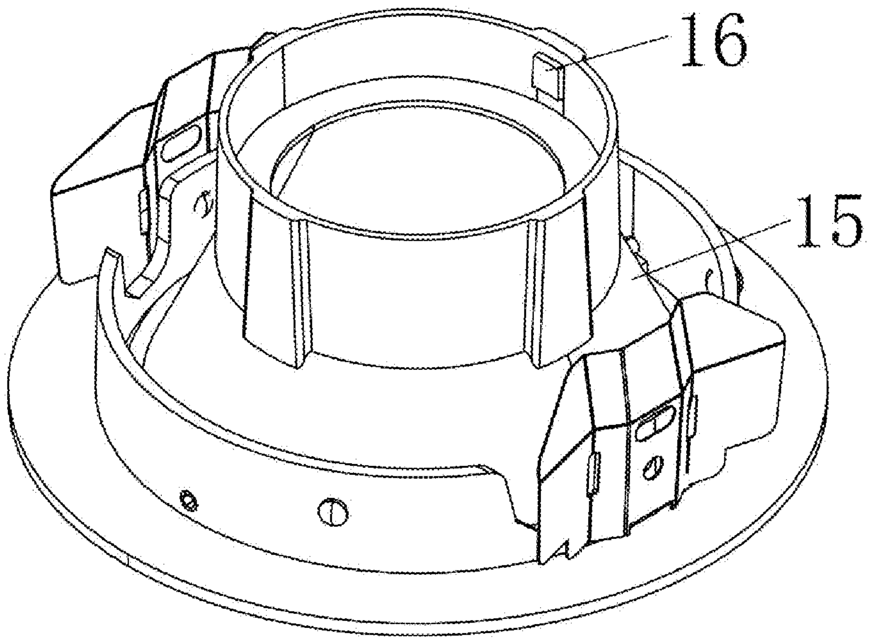
FIG. 7 is a schematic structural diagram of a lampshade according to the present disclosure.

Referring to FIG. 1 to FIG. 7, a recessed downlight with a modular design includes a light cylinder 2. An inner wall of the light cylinder 2 is connected with a mounting plate 14. A drive 9 is mounted at a top of the mounting plate 14. A top of the inner wall of the light cylinder 2 is clamped with a sealing plate 10. A conductive cable 3 is mounted at a top of the drive 9. A top of the conductive cable 3 penetrates through the sealing plate 10 and is connected with a conductive plug 4. Bottoms of two outer sides of the light cylinder 2 are jointly connected with a fastening component 5. Positioning slots 11 are provided in bottoms of the two outer sides of the light cylinder 2 and a top of the fastening component 5. A bottom of the mounting plate 14 is connected with a connecting plate 12 through a bolt 140. A luminous body 8 is mounted in a center of a top of the connecting plate 12 in a penetrating manner. A clamping ring 1 is arranged at a bottom of the inner wall of the light cylinder 2. Two outer sides of the clamping ring 1 are connected with positioning latches 6 used in conjunction with the positioning slots 11. A top of the clamping ring 1 is connected with a light reflection cup 7. A lampshade 15 sleeves the fastening component 5. Tops of two ends of an inner wall of the lampshade 15 are connected with positioning clamping blocks 16.

In a technical optimization solution of the present disclosure, a plurality of heat dissipation slots 13 are provided in two sides of a top of the sealing plate 10 in a penetrating manner. U-shaped strips are arranged on two sides of a bottom of the sealing plate 10 and are located under the heat dissipation slots 13. A space for allowing air to flow is reserved between bottoms of inner walls of the U-shaped strips and bottoms of the heat dissipation slots 13. Through the heat dissipation slots 13, it is convenient to dissipate heat generated by the drive 9 during running into an external environment. The use of the sealing plate 10 and the heat dissipation slots 13 omits a heat dissipation fin, so that a space for placing the drive 9 inside the light cylinder 2 is larger. It is conductive for heat dissipation on the drive 9.

In a technical optimization solution of the present disclosure, a lens is inlaid at an inner wall of the clamping ring 1. An opening 70 used in conjunction with the luminous body 8 is provided in one end of the light reflection cup 7. The light reflection cup 7 and the luminous body 8 can be protected through the lens. The clamping ring 1, the lens, the positioning latch 6, and the light reflection cup 7 form a whole. Without using a lens retainer, modular mounting and removal can be implemented inside the light cylinder 2.

In a technical optimization solution of the present disclosure, the fastening component 5 includes a locking edge 51 and a progressive edge 53. The locking edge 51 and the progressive edge 53 are respectively located on two sides of the light cylinder 2. Inner walls of both the locking edge 51 and the progressive edge 53 are connected to the light cylinder 2. Two gaps 50 used in conjunction with the positioning clamping blocks 16 are formed between sides of the locking edge 51 and sides the progressive edge 53, and the sides of the locking edge 51 and the sides the progressive edge 53 are opposite.

In a technical optimization solution of the present disclosure, one end of a top of the locking edge 51 is connected with a limiting convex block 52. A plurality of antislip grooves 54 are provided in a top of the progressive edge 53.

During use of the present disclosure, the clamping ring 1, the positioning latches 6, and the light reflection cup 7 are together put into the inner wall of the light cylinder 2. When the positioning latches 6 are in contact with the inner wall of the light cylinder 2, the two positioning latches 6 are pressed to deform. After the positioning latches 6 are aligned with positioning slots 11, the positioning latches 6 restore original shapes and are clamped into the positioning slots 11 to complete mounting of the clamping ring 1. During mounting of the lampshade 15, the two positioning clamping blocks 16 are aligned with the two gaps, and the lampshade 15 is moved upwards to cause the tops of the positioning clamping blocks 16 to penetrate through the two gaps. Later, the lampshade 15 is rotated to drive the two positioning clamping blocks 16 to respectively rotate at the tops of the locking edge 51 and the progressive edge 53. After one positioning clamping block 16 rotates to be separated from the antislip groove 54, the mounting of the lampshade 15 is finally completed. Further, the clamping ring 1, the lens, the positioning latch 6, and the light reflection cup 7 form a whole. Without using the lens retainer, modular mounting and removal can be implemented inside the light cylinder 2, thus improving mounting and removal efficiency and avoiding such a situation of low brightness in an edge region of a space. When a damaged luminous body 8 needs to be replaced, the two positioning latches 6 are pressed to be released from the positioning slots 11. The clamping ring 1 is taken down, and in this case, the light reflection cup 7 is taken down too. The bolt for positioning the connecting plate 12 is removed. The connecting plate 12 is removed to remove the luminous body 8 on the connecting plate. A new luminous body 8 is mounted. Finally, the removed components are mounted in sequence. Further, the use of the sealing plate 10 and the heat dissipation slots 13 omits a heat dissipation fin, so that a space for placing the drive 9 inside the light cylinder 2 is larger. It is conductive for heat dissipation on the drive 9.

The above is only the specific implementation of the present disclosure, but the protection scope of the present disclosure is not limited to this. Equivalent replacements or changes made by any person skilled in the art within the technical scope disclosed in the present disclosure based on the technical solutions and concept of the present disclosure shall all fall within the protection scope of the present disclosure.

What is claimed is:

1. A recessed downlight with a modular design, comprising a light cylinder (2), wherein an inner wall of the light cylinder (2) is connected with a mounting plate (14); a driver (9) is mounted at a top of the mounting plate (14);

a top of the inner wall of the light cylinder (2) is clamped with a sealing plate (10); a conductive cable (3) is mounted at a top of the driver (9); a top of the conductive cable (3) penetrates through the sealing plate (10) and is connected with a conductive plug (4); bottoms of two outer sides of the light cylinder (2) are jointly connected with a fastening component (5); positioning slots (11) are provided in bottoms of the two outer sides of the light cylinder (2) and a top of the fastening component (5); a bottom of the mounting plate (14) is connected with a connecting plate (12) through a bolt; a luminous body (8) is mounted in a center of a top of the connecting plate (12) in a penetrating manner; a clamping ring (1) is arranged at a bottom of the inner wall of the light cylinder (2); two outer sides of the clamping ring (1) are connected with positioning latches (6) used in conjunction with the positioning slots (11); a top of the clamping ring (1) is connected with a light reflection cup (7); a lampshade (15) sleeves the fastening component (5); and tops of two ends of an inner wall of the lampshade (15) are connected with positioning clamping blocks (16);

wherein the fastening component (5) comprises a locking edge (51) and a progressive edge (53); the locking edge (51) and the progressive edge (53) are respectively located on two sides of the light cylinder (2); inner walls of both the locking edge (51) and the progressive edge (53) are connected to the light cylinder (2); and two gaps (50) used in conjunction with the positioning clamping blocks (16) are formed between sides of the locking edge (51) and sides of the progressive edge (53), and the sides of the locking edge (51) and the sides of the progressive edge (53) are opposite.

2. The recessed downlight with the modular design according to claim 1, wherein a plurality of heat dissipation slots (13) are provided in two sides of a top of the sealing plate (10) in a penetrating manner; and U-shaped strips are arranged on two sides of a bottom of the sealing plate (10) and are located under the heat dissipation slots (13).

3. The recessed downlight with the modular design according to claim 1, wherein an opening (70) used in conjunction with the luminous body (8) is provided in one end of the light reflection cup (7).

4. The recessed downlight with the modular design according to claim 1, wherein one end of a top of the locking edge (51) is connected with a limiting convex block (52); and a plurality of antislip grooves (54) are provided in a top of the progressive edge (53).

* * * * *